(12) United States Patent
Cuthbert et al.

(10) Patent No.: US 9,389,002 B2
(45) Date of Patent: Jul. 12, 2016

(54) PROCESS FOR PRODUCING SUPERHEATED STEAM FROM A CONCENTRATING SOLAR POWER PLANT

(75) Inventors: John B. Cuthbert, Midland, MI (US); Christoph L Lang, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 671 days.

(21) Appl. No.: 13/883,250

(22) PCT Filed: Sep. 23, 2011

(86) PCT No.: PCT/US2011/052881
§ 371 (c)(1),
(2), (4) Date: May 2, 2013

(87) PCT Pub. No.: WO2012/050788
PCT Pub. Date: Apr. 19, 2012

(65) Prior Publication Data
US 2013/0269682 A1    Oct. 17, 2013

Related U.S. Application Data

(60) Provisional application No. 61/388,038, filed on Sep. 30, 2010.

(51) Int. Cl.
*F24J 2/04* (2006.01)
*F01K 3/00* (2006.01)
(Continued)

(52) U.S. Cl.
CPC ............. *F24J 2/0477* (2013.01); *F01K 3/004* (2013.01); *F01K 7/22* (2013.01); *F22B 1/006* (2013.01); *F22B 1/028* (2013.01); *F24J 2/30* (2013.01)

(58) Field of Classification Search
CPC ............. F01K 3/004; F01K 7/22; F24J 2/30; F24J 2/0477; F22B 1/028; F22B 1/006
See application file for complete search history.

(56) References Cited

U.S. PATENT DOCUMENTS

| 4,438,630 A | 3/1984 | Rowe |
| 7,055,519 B2 | 6/2006 | Litwin |

(Continued)

FOREIGN PATENT DOCUMENTS

| CN | 101413719 A | 4/2009 |
| CN | 101539123 A | 9/2009 |

(Continued)

OTHER PUBLICATIONS

Japanese Patent Application No. 2013-531670, Office Action Mailed Jun. 30, 2015.

(Continued)

*Primary Examiner* — Alfred Basichas
(74) *Attorney, Agent, or Firm* — Brooks, Cameron & Huebsch, PLLC (57) ABSTRACT

A process and an apparatus (100) for producing a superheated working fluid from a concentrating solar plant. More specifically, the process and apparatus produce superheated steam. The apparatus is designed such that it can use more than one heat transfer medium to produce the superheated working fluid. A first heat exchanger system (101) is designed to use the heat of a first heat transfer medium in order to preheat, evaporate and superheat a working fluid in a power generating working cycle (103). A second heat exchanger system (102) is designed to use the heat of a second heat transfer medium to superheat the working fluid in cycle (103).

18 Claims, 5 Drawing Sheets

(51) Int. Cl.
*F01K 7/22* (2006.01)
*F22B 1/00* (2006.01)
*F22B 1/02* (2006.01)
*F24J 2/30* (2006.01)

(56) References Cited

U.S. PATENT DOCUMENTS

| | | |
|---|---|---|
| 7,296,410 B2 | 11/2007 | Litwin |
| 2009/0320828 A1 | 12/2009 | Koketsu |
| 2010/0212318 A1 | 8/2010 | Schaal |
| 2011/0162361 A1 | 7/2011 | Schu |
| 2011/0198208 A1 | 8/2011 | Olwig et al. |

FOREIGN PATENT DOCUMENTS

| | | |
|---|---|---|
| CN | 101825072 A | 9/2010 |
| DE | 202008002599 | 5/2008 |
| DE | 102008051384 | 2/2010 |
| EP | 1519108 | 3/2005 |
| EP | 1519108 A1 | 3/2005 |
| JP | 6153524 | 11/1986 |
| JP | 2008-121483 | 5/2008 |
| JP | 2010190460 A | 9/2010 |
| WO | W02009/152496 | 12/2009 |
| WO | W02010/022184 | 2/2010 |
| WO | 2010052172 A1 | 5/2010 |
| WO | W02010/052172 | 5/2010 |
| WO | WO 2010/082206 * | 7/2010 |
| WO | W02011053863 | 5/2011 |
| WO | W02011067773 | 6/2011 |
| WO | W02011138215 | 6/2011 |

OTHER PUBLICATIONS

Chinese Patent Application No. 201180047565X, Notification of the 2nd Office Action, mailed Jun. 10, 2015.
Japanese Patent Application No. 2013-531670, Notice of Reasons for Rejection, mailed Oct. 14, 2014.
Chinese Patent Application No. 201180047565.x, Notification of the First Action, mailed Nov. 4, 2014.
International Application No. PCT/US2011/052881, International Search Report, mailed May 30, 2012.
International Application No. PCT/US2011/052881, Written Opinion of the International Searching Authority, mailed May 30, 2012.
International Application No. PCT/US2011/052881, International Preliminary Report on Patentability, completed Apr. 4, 2013.
International Application No. PCT/US2011/052881, Reply to Written Opinion, filed Aug. 24, 2012.
D. Kearney et al,, Assessment of a molten salt heat transfer fluid in a parabolic trough solar field, Transactions of the ASME, vol. 125, May 2003, pp. 170-176.
HITEC® Heat Transfer Salt, technical bulletin, Coastal Chemical Co., LLC.
D. Kearney et al., Engineering aspects of a molten salt heat transfer fluid in a trough solar field, Energy, vol. 29, 2004, pp. 861-870.
Greyer Und H Klaiss M, 194 MW Solarstrom mit Rinnenkollektoren, BWK Brennstoff Warme Kraft, Springer VDI Verlag, Dusseldorf, DE, vol. 41, No. 6, Jun. 1, 1989, pp. 288-295.
Japanese Patent Application No. 2013-531670, Office Action mailed Feb. 25, 2014.

* cited by examiner

PROCESS FOR PRODUCING SUPERHEATED STEAM FROM A CONCENTRATING SOLAR POWER PLANT

CROSS-REFERENCE TO RELATED APPLICATIONS

This application claims priority to International Application No. PCT/US11/52881, filed Sep. 23, 2011, which claims priority to U.S. Provisional Application No. 61/388,038 filed Sep. 30, 2010, all of which are hereby incorporated herein by reference in their entireties.

FIELD

This invention relates to a process for producing superheated steam from a concentrating solar plant. More specifically, this invention relates to methods and apparatuses for producing superheated steam using a first heat transfer medium, such as an organic heat transfer fluid, and a second heat transfer medium, such as a molten salt.

BACKGROUND

Concentrating solar power plants produce electricity by heating a heat transfer medium and using that heat transfer medium to produce steam, which is then used as the working fluid in a Rankine cycle. Currently, the most common type of concentrating solar power plant uses linear solar collectors, such as parabolic trough solar collectors or linear Fresnel solar collectors, to heat organic transfer fluids to temperatures of about 400 degrees Celsius. The organic heat transfer fluid then passes through a series of three heat exchangers, where water is preheated to its boiling point in the first heat exchanger, boiled in the second heat exchanger, and superheated in the third heat exchanger. The resulting superheated steam is then expanded across a turbine, which powers a generator that generates electricity.

The efficiency of this Rankine cycle is highly dependent on the temperature of the superheated steam. In a process such as the one above, the superheated steam is at about 393 degrees Celsius, resulting in a Rankine cycle efficiency of about 37.6 percent. Raising the temperature of the superheated steam to about 450-500 degrees Celsius can increase the Rankine cycle efficiency to about 40%, which results in more electricity generated per dollar of capital invested. However, the heat transfer medium is a limiting factor in achieving this high temperature. Commonly used heat transfer mediums either have too low of a maximum use temperature or are difficult to use because their freezing points or vapor pressures are too high. A need exists, therefore, for a process and apparatus capable of producing superheated steam at higher temperatures

BRIEF SUMMARY

In one aspect, an illustrative embodiment provides an apparatus comprising a first linear solar collector system for heating a first heat transfer medium and a second linear solar collector system for heating a second heat transfer medium, wherein the first and the second linear collector system are of the same collector type. The apparatus further comprises a first heat exchanger system that uses the heat from the first heat transfer medium to preheat and evaporate water and superheat steam and a second heat exchanger system that uses the heat from the second heat transfer medium to increase the temperature of the superheated steam generated by the first heat exchanger system.

In another aspect, an illustrative embodiment provides a process comprising heating a first heat transfer medium in a first linear solar collector system and heating a second heat transfer medium in a second linear solar collector system, wherein the first linear solar collector system and the second linear collector system are of the same collector type. The process further comprises supplying a working fluid to a heat exchange system, wherein the heat exchange system comprises at least a first heat exchanger system for preheating, evaporating, and superheating and at least a second heat exchanger system for further superheating, supplying the first heat transfer medium to the first heat exchanger system, and supplying the second heat transfer medium to the second heat exchanger system for superheating the working fluid.

In yet another aspect, an illustrative embodiment provides an apparatus comprising a first linear solar collector system for heating a first heat transfer medium and a second linear solar collector system for heating a second heat transfer medium, wherein the first linear collector system and the second linear collector system are of the same collector type. The apparatus further comprises a preheater configured to preheat water to produce preheated water, using heat from the first heat transfer medium, an evaporator configured to evaporate the preheated water to produce steam at a first temperature, using heat from the first heat transfer medium, a first superheater configured to superheat the steam to a second temperature to produce superheated steam, using heat from the first heat transfer medium, wherein the second temperature is greater than the first temperature, and a second superheater configured to further superheat the superheated steam to a third temperature, using heat from the second heat transfer medium, wherein the third temperature is greater than the second temperature.

The foregoing summary is illustrative only and is not intended to be in any way limiting. In addition to the illustrative aspects, embodiments, and features described above, further aspects, embodiments, and features will become apparent by reference to the drawing and the following detailed description.

DETAILED DESCRIPTION

In one aspect, an apparatus is provided for heating a working fluid using a first solar energy collection system that heats a first heat transfer medium and a second solar energy collection system that heats a second heat transfer medium, such that the two heat transfer mediums are used to heat the working fluid. The working fluid may be water. The solar energy collection systems may be linear solar energy collector systems, such as parabolic trough solar collector systems or linear Fresnel solar collector systems.

Figure 1:
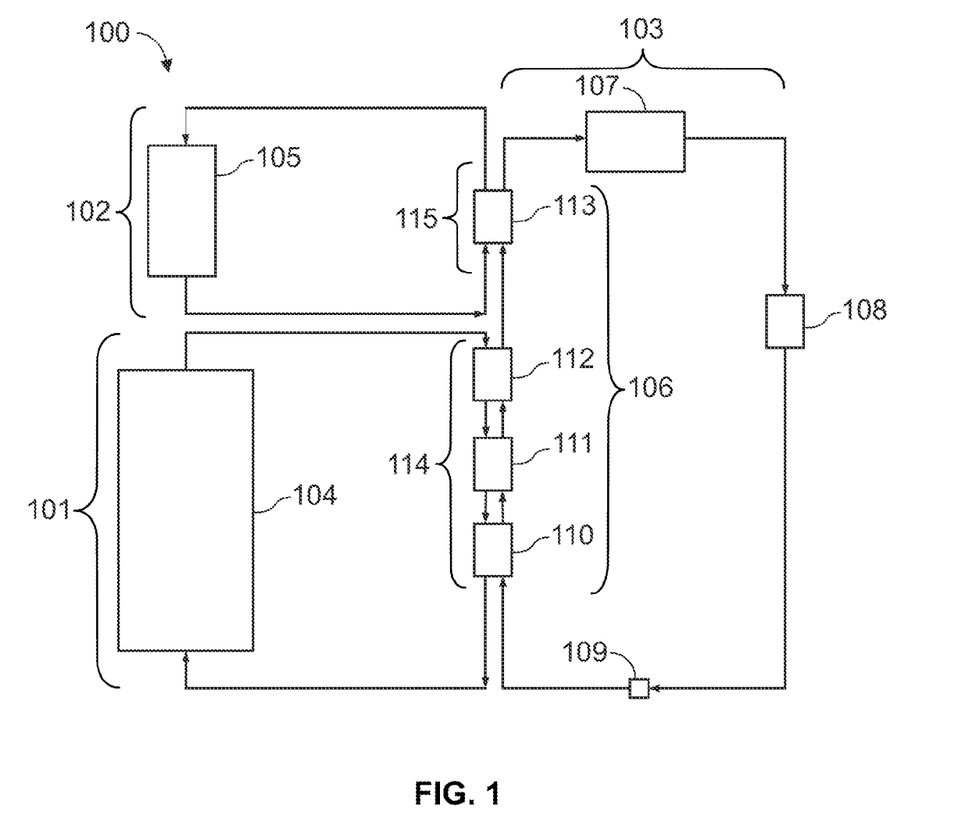
FIG. 1 is a schematic diagram of an apparatus for producing a superheated working fluid, in accordance with an illustrative embodiment.

FIG. 1 illustrates an apparatus 100 that comprises a first cycle 101 for a first heat transfer medium, a second cycle 102 for a second heat transfer medium, and a third cycle 103 for a working fluid.

The first heat transfer medium in the first cycle 101 may comprise an organic heat transfer fluid, for example, a commercially available fluid composed of diphenly oxide and biphenyl such as DOWTHERM™ A. Alternatively, the first heat transfer medium may comprise a silicone-based heat transfer fluid such as SYLTHERM® 800 fluid or may comprise other organic heat transfer fluids. The second heat transfer medium may comprise a molten salt, for example, a mixture of alkali metal salts of $NO_3$ and $NO_2$, such as mixtures of sodium, lithium, cesium, potassium salts. The molten salt may also comprise non-alkali metal salts, such as calcium salts.

The first cycle 101 may comprise a first solar energy collection system 104. The first solar energy collection system 104 may comprise, for example, a least a first linear solar energy collector system. The first linear solar energy collector system may heat the first heat transfer medium to a temperature of between about 350 and 425 degrees Celsius, more preferably between about 380 and 425 degrees Celsius, and most preferably between about 400 and 425 degrees Celsius.

The second cycle 102 may comprise a second solar energy collection system 105. The second solar energy collection system 105 may comprise, for example, at least a second linear solar energy collector system. The second linear solar energy collector system may heat the second heat transfer medium to a temperature of between about 450 and 600 degrees Celsius, more preferably between about 500 and 600 degrees Celsius, and most preferably between about 550 and 600 degrees Celsius.

The first heat transfer medium and the second heat transfer medium may transfer heat to third cycle 103. The working fluid in third cycle 103 may be used in a Rankine cycle. Thus, third cycle 103 may comprise a heat exchange system 106, a turbine system 107, a condenser 108, and a pumping system 109. The working fluid could be water. Alternatively, the working fluid could also be an organic fluid or a silicon-based fluid. The heat exchange system 106 may comprise a plurality of heat exchangers, for example, a preheater 110, an evaporator 111, a first superheater 112, and a second superheater 113. The preheater 110, the evaporator 111, and the first superheater 112 may comprise a first heat exchanger system 114. The second superheater 113 may comprise a second heat exchanger system 115. In addition, the third cycle 103 may comprise additional heat exchangers, such as a pre-reheater (optional) and a reheater (not shown). The heat exchangers could be, for example, shell-and-tube heat exchangers. The third cycle 103 may also include steam extraction, condensate preheating, and degassing.

In the first cycle 101, the first heat transfer medium may flow through the first superheater 112, the evaporator 111, and the preheater 110 before returning to the first solar energy collection system 104. Optionally, a partial flow of the first heat transfer medium from first cycle 101 may flow through a pre-reheater. When a pre-reheater is used, the partial flow to the pre-reheater may be smaller than the partial flow to the partial flow to the first superheater 112. In the second cycle 102, the second heat transfer medium may flow through the second superheater 113 before returning to the second solar energy collection system 105. A small partial flow or the total flow of the second heat transfer medium from cycle 102 may flow through a reheater.

The preheater 110 may heat the working fluid to about its boiling point, using heat from the first heat transfer medium. The evaporator 111 may evaporate the preheated working fluid, using heat from the first heat transfer medium, such that the evaporated working fluid is at a first temperature. The evaporated working fluid may enter the first superheater 112 and then may enter the second superheater 113, where it may be superheated to a second temperature, using heat from the second heat transfer medium. When water is used as the working fluid, the first temperature may be between about 300 and 374 degrees Celsius, more preferably between about 300 and 350 degrees Celsius, and most preferably between about 300 and 315 degrees Celsius. The second temperature may be between about 370 and 570 degrees Celsius, more preferably between about 430 and 550 degrees Celsius, and most preferably between about 500 and 550 degrees Celsius.

The superheated working fluid may be expanded across the turbine system 107 to produce mechanical energy, which may be converted into electricity by a generator. The turbine system 107 may include one or more turbines. The turbines may be low, medium, or high-pressure turbines. The working fluid may then be condensed in the condenser 108 and pumped back to the heat exchange system 106 by the pumping system 109.

In this embodiment, the mass flow rate of the first heat transfer medium in the first cycle 101 may be larger than the mass flow rate of the second heat transfer medium in the second cycle 102. For example, the ratio of mass flow rate of the first heat transfer medium to the mass flow rate of the second heat transfer medium may be about 60:40, more preferably about 80:20, and most preferably about 95:5. Because of the technological challenges of working with the high freezing points of molten salts, it may be beneficial to have the second cycle 102 heating the molten salt be much smaller than the first cycle 101 heating the organic heat transfer fluid.

In yet another embodiment, the third cycle 103 may comprise two or more heat exchange systems that may heat a working fluid.

In a further embodiment, the turbine system 107 may comprise three turbines: a high-pressure turbine, a medium-pressure turbine, and a low-pressure turbine. In this embodiment, two reheating systems may be used. Each reheating system may comprise one or two reheaters. A first reheating system may reheat the heat transfer fluid before it expands across the low-pressure turbine. A second reheating system may reheat the heat transfer fluid before it expands across the medium-pressure turbine.

In another embodiment, there may be more than two solar energy collection systems. For example, a first solar energy collection system could heat a first heat transfer fluid. A second solar energy collection system could heat a second heat transfer fluid, for example, an organic heat transfer fluid such as DOWTHERM™ A. A third solar energy collection system could heat a third heat transfer fluid, for example, a molten salt. The three heat transfer mediums could be used to heat water to produce superheated steam in a Rankine cycle.

In yet another embodiment, a fuel fired heat transfer fluid heater and fuel fired molten salt heater may heat the first heat transfer fluid and the second heat transfer fluid, respectively, at start-up or during cold periods to prevent the system from freezing. In addition, the first heat transfer medium may heat the second heat transfer medium and a third heat transfer medium, such as another molten salt, may heat the first heat transfer fluid at start-up or during cold periods. The third heat transfer medium may comprise a molten salt that may be the same or different as the molten salt of the second heat transfer medium.

In a further embodiment, the first heat transfer medium may heat the second heat transfer medium and the second heat transfer medium, such as a molten salt, may heat the first heat transfer medium at start-up or during cold periods. This embodiment may include three molten salt storage vessels with transfer pumps, one for storing cold molten salt, one for storing medium temperature molten salt (for example, the molten salt that has been used to heat the working fluid), and one for storing hot molten salt (for example, the molten salt that has been heated by the second solar energy collection system). The medium temperature molten salt may heat the first heat transfer medium. This embodiment may save energy because not all of the molten salt is stored at very high temperatures, thus heat loss may be minimized.

EXAMPLES

Various examples of the invention are demonstrated using a computer simulation.

Example 1

Figure 2:
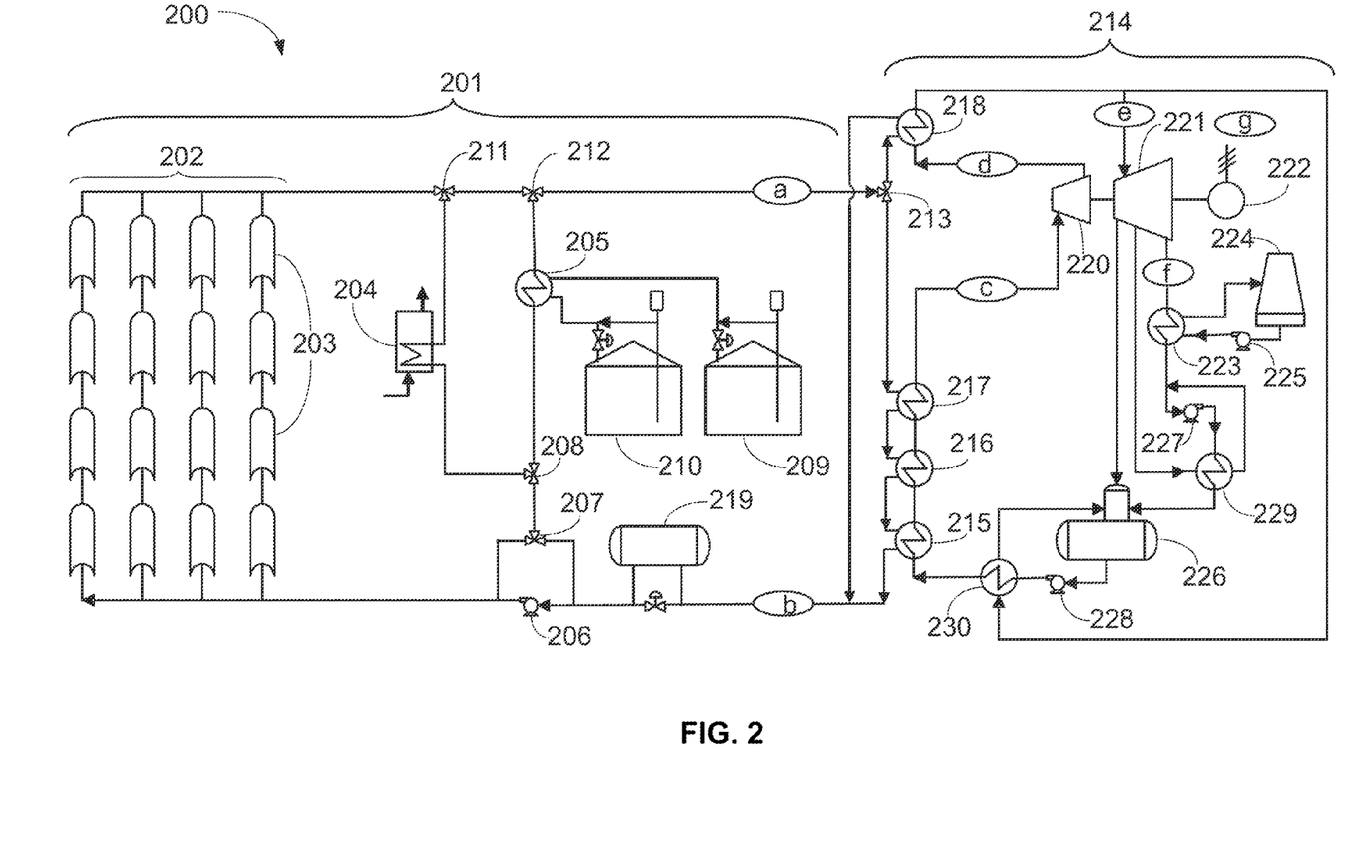
FIG. 2 is a schematic diagram of an apparatus for producing superheated steam using one parabolic trough solar collector system and an organic heat transfer fluid, in accordance with an illustrative embodiment.

Production of Superheated Steam with One Parabolic Trough Solar Collector System and an Organic Heat Transfer Fluid Superheated steam is produced using one solar energy collection system, such as a parabolic trough solar collector system or a linear Fresnel solar collector system, and one heat transfer fluid, such as DOWTHERM™ A. FIG. 2 illustrates an apparatus 200 for producing superheated steam and for using that superheated steam to produce electricity. The apparatus 200 comprises a first cycle 201, which includes a solar energy collection system 202 comprising a plurality of parabolic trough solar collectors 203. The same results are obtained using a linear Fresnel solar collector system. A heat transfer fluid such as DOWTHERM™ A is introduced into the solar energy collection system 202. The solar energy collection system 202 heats the heat transfer fluid to a temperature of about 393 degrees Celsius (at point a). An optional fuel fired heat transfer fluid heater 204 and an optional molten salt heat exchanger system 205 may also assist in heating the heat transfer fluid, for example, at start-up or during cold periods to prevent the system from freezing. Before and/or after heat transfer fluid circulation pumps 206, the heat transfer fluid may enter a first valve 207 and a second valve 208. At the second valve 208, the heat transfer fluid may either flow through the fuel fired heat transfer fluid heater 204 or the molten salt heat exchanger system 205, where the heat transfer fluid may be heated. If the sun does not provide enough energy to power the turbines, a molten salt storage system may be used. A hot molten salt storage vessel 209, which includes molten salt circulation pumps, provides hot molten salt to the molten salt heat exchanger system 205, where the heat transfer fluid is heated. After heating the heat transfer fluid, the cooled molten salt returns to a cold molten salt storage vessel 210, which includes molten salt circulation pumps. During hours of high-radiation sun, a partial flow from the solar energy collection system 202 may pass through a third valve 211, a fourth valve 212, and a fifth valve 213 to a Rankine cycle 214. The other part of the flow may enter the molten salt heat exchanger system 205, where the molten salt from the cold molten salt storage vessel 210 may be heated and pumped to the hot molten salt storage vessel 209. The flow that is passing through the molten salt heat exchanger system 205 passes through the second valve 208 and the first valve 207 and is then pumped back to the solar energy collection system 202 for heating. When the fuel fired heat transfer fluid heater 204 and the molten salt heat exchanger system 205 are used, the heat transfer fluid heated by the fuel fired heat transfer fluid heater 204 may enter the third valve 211 and the heat transfer fluid heated by the molten salt heat exchanger system 205 may enter the fourth valve 212, where it may flow to the fifth valve 213.

After being heated, the heat transfer fluid is used to heat a working fluid in the Rankine cycle 214. The Rankine cycle includes various shell and tube heat exchangers: a preheater 215, an evaporator 216, a superheater 217, and a reheater 218. At the fifth valve 213, a portion of the heat transfer fluid flows through the reheater 218 and a portion of the heat transfer fluid flows through the superheater 217, the evaporator 216, and the preheater 215. After passing through the heat exchangers, the heat transfer fluid is at a temperature of about 255 degrees Celsius (at point b) and it is pumped by the heat transfer fluid circulation pumps 206 to the solar energy collection system 202 to be heated again. During startup and venting operations, the heat transfer fluid passes through a heat transfer fluid expansion vessel 219.

In the Rankine cycle 214, a working fluid such as water is superheated and used to generate electricity. The water flows through the preheater 215, where it is heated to about its boiling point. It then flows through the evaporator 216, where it is brought to a boil. It next flows through the superheater 217, where it is superheated to about 380 degrees Celsius at a pressure of about $1 \times 10^7$ Pascal (100 bar) (at point c). The superheated steam is expanded across a high-pressure turbine 220, where it cools to about 212 degrees Celsius and the pressure is reduced to about $2 \times 10^6$ Pascal (20 bar) (at point d). A portion of the steam then flows through the reheater 218, where it is heated again to about 380 degrees Celsius at a pressure of about $2 \times 10^6$ Pascal (20 bar) (at point e). Next, the reheated low-pressure steam expands over a low-pressure turbine 221.

The high-pressure turbine 220 and the low-pressure turbine 221 power a generator 222 at a power of about 27.5 megawatts and a Rankine cycle efficiency of about 34.9 percent (at point g).

After expanding over the low-pressure turbine 221, the steam is at a temperature of about 46 degrees Celsius and a pressure of about $1 \times 10^4$ Pascal (0.1 bar) (at point f). The steam then enters a condenser 223. A cooling water loop cycles cooling water from a cooling water tower 224 via cooling water pumps 225 to the condenser 223 in order to condense the steam that exits the low-pressure turbine 221. In alternative embodiments, the cooling may be performed through air-cooling or dry cooling. A small portion of low-pressure steam enters a feed water/de-aerator vessel 226, in order to de-aerate the feed water. The steam may exit the turbines through a plurality of exits. Each portion of steam exiting each of the plurality of exits may have a different temperature and pressure. For example, the small portion of the steam that enters the feed water/de-aerator vessel 226 has a higher pressure and temperature than the portion of the steam entering the condenser 223. The condensate from the condenser 223 is pumped via low-pressure feedwater pumps 227 to the feed water/de-aerator vessel 226 and is next pumped from low to high pressure via high-pressure feed water pumps 228 back to the preheater 215. Optional low-pressure feed water heat exchangers 229 and high-pressure feed water heat exchangers 230 are not considered for this example.

The parameters for apparatus 200 are shown in Table 1 below.

TABLE 1

Parameters for System with One Heat Transfer Fluid Loop

|  | a | b | c | d | e | F | g |
|---|---|---|---|---|---|---|---|
| Water/Steam (metric tons/hour) |  |  | 85.8 | 85.8 | 85.8 | 85.8 |  |
| HTF (metric tons/hour) | 788.2 | 788.2 |  |  |  |  |  |
| Salt (metric tons/hour) |  |  |  |  |  |  |  |
| Power (MW) |  |  |  |  |  |  | 27.5 |
| Efficiency (%) |  |  |  |  |  |  | 34.9 |
| Temperature (degrees Celsius) | 393.0 | 254.6 | 380.0 | 212.4 | 380.0 | 45.8 |  |
| Pressure (Pascal) | $1.2 \times 10^6$ | $1.1 \times 10^6$ | $1 \times 10^7$ | $2 \times 10^6$ | $2 \times 10^6$ | $1 \times 10^4$ |  |
| Vapor Fraction | 0.00 | 0.00 | 1.00 | 0.96 | 1.00 | 0.90 |  |

Example 2

Production of Superheated Steam with Two Parabolic Trough Solar Collector Systems, an Organic Heat Transfer Fluid, and Molten Salt (No Steam Extraction, Intermediate Steam Pressure)

Figure 3:
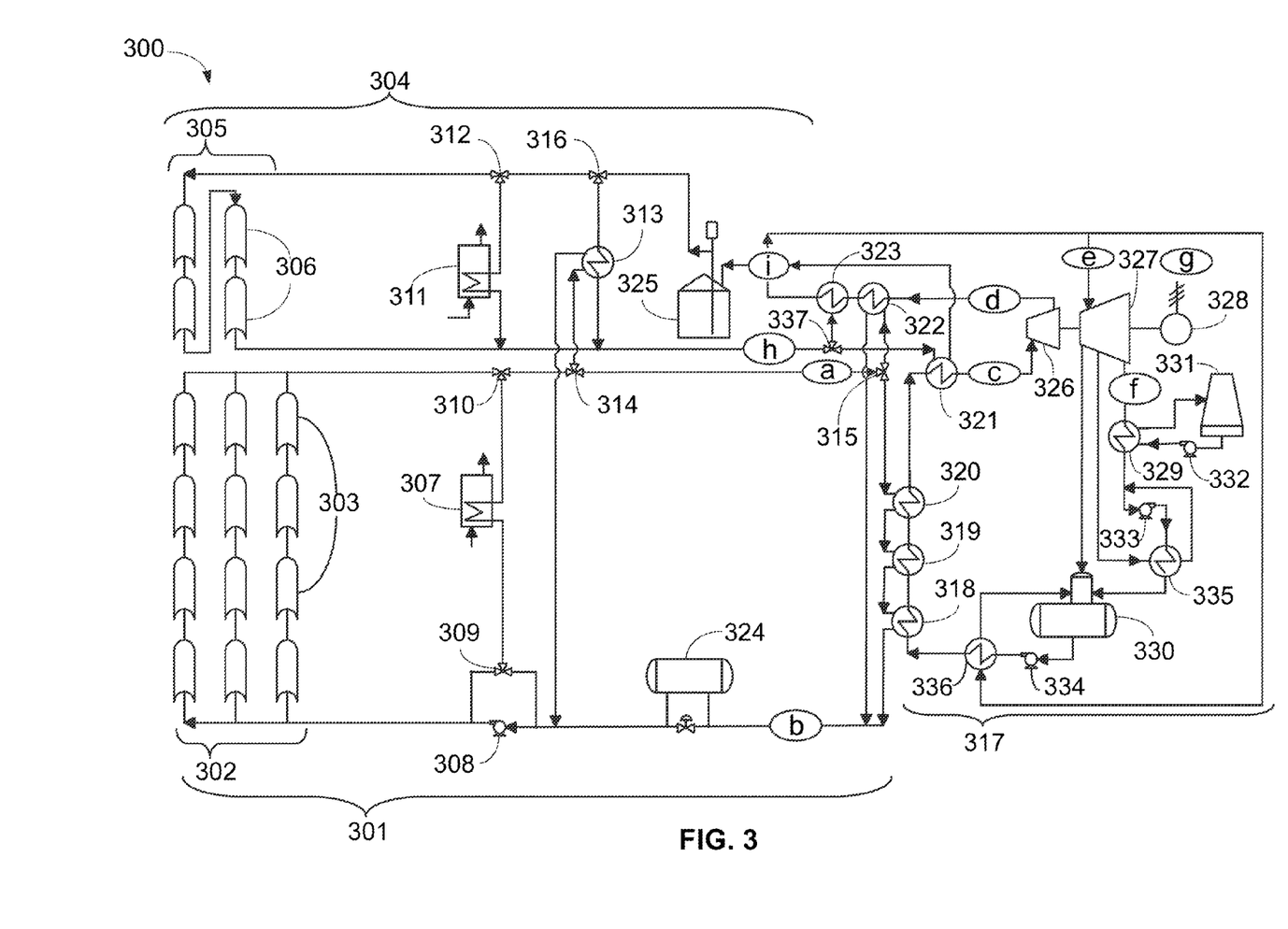
FIG. 3 is a schematic diagram of an apparatus for producing superheated steam using two parabolic trough solar collector systems, an organic heat transfer fluid, and a molten salt, in accordance with an illustrative embodiment.

Superheated steam is produced using two solar energy collection systems, such as parabolic trough solar collector systems or linear Fresnel solar collector systems, one heat transfer fluid, such as DOWTHERM™ A, and a molten salt. FIG. 3 illustrates an apparatus 300 for producing superheated steam and for using that superheated steam to produce electricity. The apparatus 300 comprises a first cycle 301, which includes a first solar energy collection system 302 comprising a first plurality of parabolic trough solar collectors 303, and a second cycle 304, which includes a second solar energy collection system 305 comprising a second plurality of parabolic trough solar collectors 306. The same results are obtained using linear Fresnel solar collector systems. A heat transfer fluid such as DOWTHERM™ A is introduced into the first solar energy collection system 302. The first solar energy collection system 302 heats the heat transfer fluid to a temperature of about 393 degrees Celsius (at point a). An optional fuel fired heat transfer fluid heater 307 may also assist in heating the heat transfer fluid, for example, at start-up or during cold periods to prevent the system from freezing. Before and/or after heat transfer fluid circulation pumps 308, the heat transfer fluid may enter a first valve 309 and then may flow through the fuel fired heat transfer fluid heater 307, where the heat transfer fluid may be heated. The heat transfer fluid may then enter a second valve 310.

In the second cycle 304, a molten salt is introduced into the second solar energy collection system 305. The second solar energy collection system 305 heats the molten salt to a temperature of about 565 degrees Celsius (at point h). An optional fuel fired molten salt heater 311 may also assist in heating the heat transfer fluid, for example, at start-up or during cold periods to prevent the system from freezing. The molten salt may enter a third valve 312 and then may flow through the fuel fired molten salt heater 311, where the molten salt may be heated. In addition, an optional heat exchanger system 313 may heat the molten salt using the heat transfer fluid from the first cycle 301. The heat transfer fluid may enter a fourth valve 314 and then may flow through the heat exchanger system 313 before returning to the first cycle 301. The heat transfer fluid from the second valve 310 and the fourth valve 314 may flow to a fifth valve 315. The molten salt may enter a sixth valve 316 and then flow through the heat exchanger system 313, where it is heated by the heat transfer fluid.

After being heated, the heat transfer fluid and the molten salt are used to heat a working fluid in a Rankine cycle 317. The Rankine cycle includes various shell and tube heat exchangers: a preheater 318, an evaporator 319, a first superheater 320, a second superheater 321, a pre-reheater 322, and a reheater 323. In alternative embodiments, the pre-reheater 322 may be optional. At the fifth valve 315, a portion of the heat transfer fluid flows through the pre-reheater 322 and a portion of the heat transfer fluid flows through the first superheater 320, the evaporator 319, and the preheater 318. The molten salt enters a sixth valve 337 from where a partial flow goes through the second superheater 321 and the other portion to the reheater 323. In alternative embodiments, the molten salt flow may flow through the second superheater 321 first and then through the reheater 323. After passing through the heat exchangers, the heat transfer fluid is at a temperature of about 288 degrees Celsius (at point b). The heat transfer fluid is then pumped by the heat transfer fluid circulation pumps 308 to the first solar energy collection system 302 to be heated again. During startup and venting operations, the heat transfer fluid passes through a heat transfer fluid expansion vessel 324. During normal operation, the heat transfer fluid bypasses the heat transfer fluid expansion vessel 324. After the molten salt passes through the heat exchangers, it enters a molten salt storage vessel 325 before returning to the second solar energy collection system 305 to be heated again.

In the Rankine cycle 317, a working fluid such as water is superheated and used to generate electricity. The water flows through the preheater 318, where it is heated to about the boiling point of water. It then flows through the evaporator 319, where it is brought to a boil. It next flows through the first superheater 320 and the second superheater 321, where it is superheated to about 530 degrees Celsius at a pressure of about $1 \times 10^7$ Pascal (100 bar) (at point c). The superheated steam is expanded across a high-pressure turbine 326, where it cools to about 307 degrees Celsius and the pressure is reduced to about $2 \times 10^6$ Pascal (20 bar) (at point d). The steam then flows through the pre-reheater 322 and the reheater 323, where it is heated again to about 530 degrees Celsius at a pressure of about $2 \times 10^6$ Pascal (20 bar) (at point e). Next, the steam expands over a low-pressure turbine 327.

The high-pressure turbine 326 and the low-pressure turbine 327 power a generator 328 at a power of about 27.5 megawatts and a Rankine cycle efficiency of about 38.1 percent (at point g). Compared to Example 1, this Example provides a higher Rankine efficiency due to the higher temperature of the superheated steam.

After expanding over the low-pressure turbine 327, the steam is at a temperature of about 46 degrees Celsius and a pressure of about $1 \times 10^4$ Pascal (0.1 bar) (at point f). A portion of the steam then enters a condenser 329 and a portion of the steam enters a feed water/de-aerator vessel 330, in order to de-aerate the feed water. The steam may exit the turbines through a plurality of exits. Each portion of steam exiting each of the plurality of exits may have a different temperature and pressure. For example, the small portion of the steam that enters the feed water/de-aerator vessel 330 has a higher pressure and temperature than the portion of the steam entering the condenser 329. A cooling water loop cycles cooling water from a cooling water tower 331 via cooling water pumps 332 to the condenser 329 in order to condense the steam that exits the low-pressure turbine 327. In alternative embodiments, the cooling may be performed through air-cooling or dry cooling. The condensate from the condenser 329 then is pumped via low-pressure feed water pumps 333 to the feedwater/de-aerator vessel 330 and is next pumped from low to high pressure via high-pressure feedwater pumps 334 back to the preheater 318. Optional low-pressure feed water heat exchangers 335, high-pressure feed water heat exchangers 336, and steam to feed water de-aerator are not considered for this example.

The parameters for Example 2 are shown in Table 2 below.

TABLE 2

Parameters for System with Two Heat Transfer Fluid Cycles

|  | A | b | c | D | e | f | g | h | i |
|---|---|---|---|---|---|---|---|---|---|
| Water/Steam (metric tons/hour) |  |  | 69.3 | 69.3 | 69.3 | 69.3 |  |  |  |
| HTF (metric tons/hour) | 695.1 | 695.1 |  |  |  |  |  |  |  |
| Salt (metric tons/hour) |  |  |  |  |  |  |  | 237.1 | 237.1 |
| Power (MW) |  |  |  |  |  |  | 27.5 |  |  |
| Efficiency (%) |  |  |  |  |  |  | 38.1 |  |  |
| Temperature (degrees Celsius) | 393.0 | 288.1 | 530.0 | 307.0 | 530.0 | 45.8 |  | 565.0 | 328.9 |
| Pressure (Pascal) | $1.2 \times 10^6$ | $1.1 \times 10^6$ | $1 \times 10^7$ | $2 \times 10^6$ | $2 \times 10^6$ | $1 \times 10^4$ |  | $3 \times 10^5$ | $2 \times 10^5$ |
| Vapor Fraction | 0.00 | 0.00 | 1.00 | 1.00 | 1.00 | 0.97 |  | 0 | 0 |

Example 3

Production of Superheated Steam with Two Parabolic Trough Solar Collector Systems, an Organic Heat Transfer Fluid, and Molten Salt (Steam Extraction, Intermediate Steam Pressure)

This Example uses the same apparatus 300 as in Example 2, with steam being extracted at the high-pressure turbine 326 to preheat the feed water at high-pressure feed water heat exchangers 336. Compared to Example 2 the condensate from the condenser 329 is pumped from high-pressure feed water pumps 334 via the high-pressure feed water heater exchangers 336, where it is preheated by steam extractions from the high-pressure turbine 326, back to the preheater 318. Optional low-pressure feed water heat exchangers 335 and steam to feed water de-aerator are not considered for this example.

This steam extraction allows for an increase in Rankine cycle efficiency from the 38.1 percent of Example 2 to about 39.6 percent. The parameters for Example 3 are shown in Table 3 below.

TABLE 3

Parameters for System with Two Heat Transfer Fluid Cycles and Steam Extraction

|  | A | b | c | d | e | f | g | h | I |
|---|---|---|---|---|---|---|---|---|---|
| Water/Steam (metric tons/hour) |  |  | 65.3 | 65.3 | 53.5 | 53.5 |  |  |  |
| HTF (metric tons/hour) | 695.1 | 695.1 |  |  |  |  |  |  |  |
| Salt (metric tons/hour) |  |  |  |  |  |  |  | 227.2 | 227.2 |

TABLE 3-continued

Parameters for System with Two Heat Transfer Fluid Cycles and Steam Extraction

| | A | b | c | d | e | f | g | h | I |
|---|---|---|---|---|---|---|---|---|---|
| Power (MW) | | | | | | | 27.5 | | |
| Efficiency (%) | | | | | | | 39.6 | | |
| Temperature (degrees Celsius) | 393.0 | 288.1 | 530.0 | 307.0 | 530.0 | 45.8 | | 565.0 | 393.1 |
| Pressure (Pascal) | $1.2 \times 10^6$ | $1.1 \times 10^6$ | $1 \times 10^7$ | $2 \times 10^6$ | $2 \times 10^6$ | $1 \times 10^4$ | | $3 \times 10^5$ | $2 \times 10^5$ |
| Vapor Fraction | 0.00 | 0.00 | 1.00 | 1.00 | 1.00 | 0.97 | | 0 | 0 |

Example 4

Production of Superheated Steam with Two Parabolic Trough Solar Collector Systems, an Organic Heat Transfer Fluid, and Molten Salt (Steam Extraction, Moderate Intermediate Steam Pressure)

This Example also uses the same apparatus 300 as in Example 2 and Example 3, with steam being extracted at the high-pressure turbine 326. In addition, the steam pressure after the high-pressure turbine is lower than in Examples 1, 2, and 3 (about $1.2 \times 10^6$ Pascal versus about $2 \times 10^6$ Pascal). The steam extraction and lower intermediate steam pressure allows for an increase in Rankine cycle efficiency from the 38.1 percent of Example 2 and the 39.6 percent of Example 3 to about 39.8 percent. The parameters for Example 4 are shown in Table 4 below.

TABLE 4

Parameters for System with Two Heat Transfer Fluid Cycles and Steam Extraction and Moderate Intermediate Steam Pressure

| | A | b | c | D | e | f | g | h | i |
|---|---|---|---|---|---|---|---|---|---|
| Water/Steam (metric tons/hour) | | | 62.7 | 62.7 | 51.4 | 51.4 | | | |
| HTF (metric tons/hour) | 669.4 | 669.4 | | | | | | | |
| Salt (metric tons/hour) | | | | | | | | 216.5 | 216.5 |
| Power (MW) | | | | | | | 27.5 | | |
| Efficiency (%) | | | | | | | 39.8 | | |
| Temperature (degrees Celsius) | 393.0 | 283.0 | 530.0 | 250.9 | 530.0 | 45.8 | | 565.0 | 283.0 |
| Pressure (Pascal) | $1.2 \times 10^6$ | $1.1 \times 10^6$ | $1 \times 10^7$ | $1.2 \times 10^6$ | $1.2 \times 10^6$ | $1 \times 10^4$ | | $3 \times 10^5$ | $2 \times 10^5$ |
| Vapor Fraction | 0.00 | 0.00 | 1.00 | 1.00 | 1.00 | 1.00 | | 0 | 0 |

Examples 5 and 6 provide alternative designs for the two cycle apparatus discussed in Examples 2, 3, and 4. The system parameters of Example 5 can be the same as for Examples 2, 3, or 4. Example 6 works with the same system parameters as shown in Example 3.

Example 5

Production of Superheated Steam (Four Vessels Design)

Figure 4:
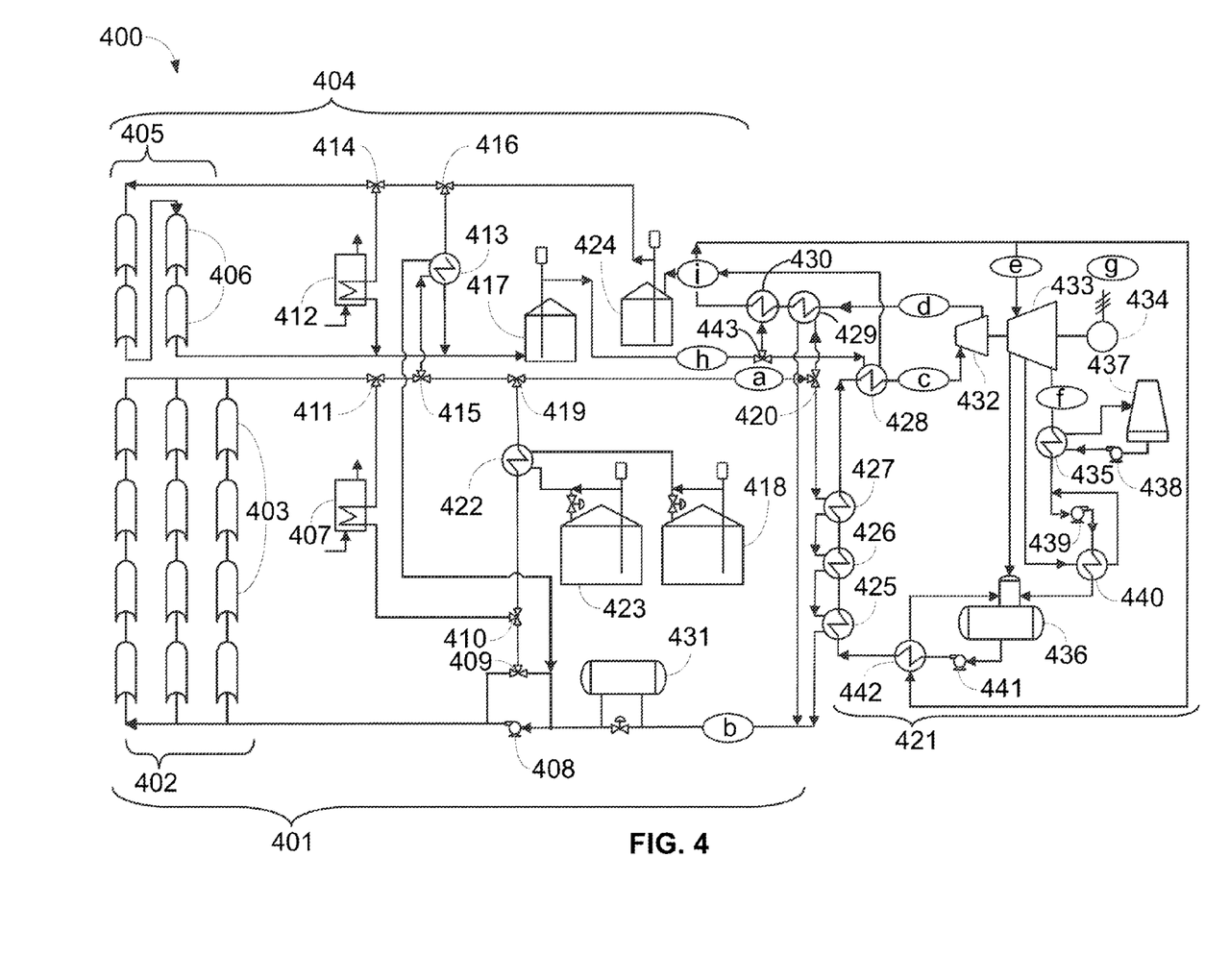
FIG. 4 is a schematic diagram of an apparatus for producing superheated steam using two parabolic trough solar collector systems, an organic heat transfer fluid, a molten salt, and four thermal energy storage vessels, in accordance with an illustrative embodiment.

Superheated steam is produced using two solar energy collection systems, such as parabolic trough solar collector systems or linear Fresnel solar collector systems, one heat transfer fluid, such as DOWTHERM™ A, and at least one molten salt. FIG. 4 illustrates an apparatus 400 for producing superheated steam and for using that superheated steam to produce electricity. The apparatus 400 comprises a first cycle 401, which includes a first solar energy collection system 402 comprising a first plurality of parabolic trough solar collectors 403, and a second cycle 404, which includes a second solar energy collection system 405 comprising a second plurality of parabolic trough solar collectors 406. The same results are obtained using linear Fresnel solar collector systems. A heat transfer fluid such as DOWTHERM™ A is introduced into the first solar energy collection system 402. The first solar energy collection system 402 heats the heat transfer fluid to a temperature of about 393 degrees Celsius (at point a). An optional fuel fired heat transfer fluid heater 407 may also assist in heating the heat transfer fluid, for example, at start-up or during cold periods to prevent the system from freezing. Before and/or after heat transfer fluid circulation pumps 408, the heat transfer fluid may enter a first valve 409 and a second valve 410. The heat transfer fluid then may flow through the fuel fired heat transfer fluid heater 407, where the heat transfer fluid may be heated. The heat transfer fluid may then enter a third valve 411.

In the second cycle 404, a molten salt is introduced into the second solar energy collection system 405. The second solar energy collection system 405 heats the molten salt to a temperature of about 565 degrees Celsius (at point h). An optional fuel fired molten salt heater 412 may also assist in heating the heat transfer fluid, for example, at start-up or during cold periods to prevent the system from freezing. In addition, an optional first heat exchanger system 413 may heat the molten salt using the heat transfer fluid from the first cycle 401 or the molten salt from the second cycle 404 may heat the heat transfer fluid from the first cycle 401 via the first heat exchanger system 413. The molten salt may enter a fourth valve 414 and then may flow through the fuel fired molten salt heater 412, where the molten salt may be heated. If there is sufficient heat stored in the first cycle 401, the heat transfer fluid from the first cycle 401 may enter a fifth valve 415 and then may flow through the heat exchanger system 413 before returning to the first cycle 401. The molten salt may enter a sixth valve 416 and then flow through the heat transfer fluid heat exchanger 413, where it is heated by the heat transfer fluid. After being heated by the second solar energy collection system 405, the fuel fired molten salt heater 412, and/or the heat transfer fluid heat exchanger 413, the molten salt enters a first hot molten salt storage vessel 417.

The first solar energy collection system 402 and the second solar energy collection system 405 are designed to generate excessive energy during the daylight hours, which is stored in the first hot molten salt storage vessel 417 and a second hot molten salt storage vessel 418. During high-radiation sunshine hours, a partial flow from the first solar energy collection system 403 passes through the third valve 411, the fifth valve 415, a seventh valve 419, and an eighth valve 420 to a Rankine cycle 421 and the other portion enters a second heat exchanger system 422 via the seventh valve 419, where the molten salt from a first cold molten salt storage vessel 423 is heated and pumped to the second hot molten salt storage vessel 418. The flow that passes the second heat exchanger system 422, also passes through the second valve 410 and the first valve 409, and is pumped back to the solar energy collection system 403 by the heat transfer fluid circulation pumps 408 for further heating. In the second cycle 404, the molten salt from a second cold molten salt storage vessel 424 is pumped via the sixth valve 416 and the fourth valve 414 to the second solar energy collection system 405 to be heated. The hot molten salt from the second solar energy collection system 406 is then stored in the first hot molten salt storage vessel 417. The first cycle 401 may use a less expensive molten salt than the molten salt in the second cycle 404, as the molten salt used in the first cycle 401 is heated to a lower temperature than the molten salt in the second cycle 404.

When sunshine is not sufficient to heat the heat transfer fluid and the molten salt, the apparatus 400 switches to a freeze protection mode and the Rankine cycle 421 is heated by the stored energy from the first hot molten salt storage vessel 417 and the second hot molten salt storage vessel 418. The heat transfer fluid may be pumped by the heat transfer fluid circulation pumps 408 through the first valve 409 and the second valve 410. Then, the heat transfer fluid may either flow through the fuel fired heat transfer fluid heater 407 (optional) or the second heat exchanger system 422, where the heat transfer fluid may be heated before entering the third valve 411 or the seventh valve 419 and then entering the Rankine cycle 421 via the eighth valve 420. Molten salt from the second molten salt hot storage vessel 418 in the first cycle 401 is pumped through the second heat exchanger system 422 to the first cold molten salt storage vessel 423, while the heat transfer fluid that passes through the second heat exchanger system 422 is heated. In the second cycle 404, the molten salt may be pumped from the first hot molten salt storage vessel 417 to the Rankine cycle 421 and then to the second cold molten salt storage vessel 424. The first hot molten salt storage vessel 417, the second hot molten salt storage vessel 418, the first cold molten salt storage vessel 423, and the second cold molten salt storage vessel 424 include transfer pumps.

After being heated, the heat transfer fluid and the molten salt are used to heat a working fluid in the Rankine cycle 421. The Rankine cycle includes various shell and tube heat exchangers: a preheater 425, an evaporator 426, a first superheater 427, a second superheater 428, a pre-reheater 429, and a reheater 430. In other embodiments, the pre-reheater 429 may be optional. At the eighth valve 420, a portion of the heat transfer fluid flows through the pre-reheater 429 and a portion of the heat transfer fluid flows through the first superheater 427, the evaporator 426, and the preheater 425. The molten salt enters a ninth valve 443 from where a partial flow goes to the second superheater 428 and the other portion to the reheater 430. In alternative embodiments, the molten salt flow may flow through the second superheater 428 first and then through the reheater 430. After passing through the heat exchangers, the heat transfer fluid is at a temperature of about 288 degrees Celsius (at point b). The heat transfer fluid is then pumped by the heat transfer fluid circulation pumps 408 to the first solar energy collection system 402 to be heated again. During startup and venting operations, the heat transfer fluid passes through a heat transfer fluid expansion vessel 431. During normal operation, the heat transfer fluid bypasses the heat transfer fluid expansion vessel 431.

The Rankine cycle 421 may operate in a similar way to the Rankine cycles in Examples 2, 3, or 4. In the Rankine cycle 421, a working fluid such as water is superheated and used to generate electricity. The water flows through the preheater 425, where it is heated to about the boiling point of water. It then flows through the evaporator 426, where it is brought to a boil. It next flows through the first superheater 427 and the second superheater 428, where it is superheated to about 530 degrees Celsius at a pressure of about $1 \times 10^7$ Pascal (100 bar) (at point c). The superheated steam is expanded across a high-pressure turbine 432, where it cools to about 307 degrees Celsius and the pressure is reduced to about 20 bar (at point d). A portion of the steam then flows through the pre-reheater 429 and the reheater 430, where it is heated again to about 530 degrees Celsius at a pressure of about $2 \times 10^6$ Pascal (20 bar) (at point e). Next, reheated low-pressure steam expands over a low-pressure turbine 433.

The high-pressure turbine 432 and the low-pressure turbine 433 power a generator 434 at a power of about 27.5 megawatts and a Rankine cycle efficiency of about 39.6 percent (at point g). Compared to Example 1, this Example provides a higher Rankine efficiency due to the higher temperature of the superheated steam.

After expanding over the low-pressure turbine 433, the water is at a temperature of about 46 degrees Celsius and a pressure of about $1 \times 10^4$ Pascal (0.1 bar) (at point f). A portion of the steam then enters a condenser 435 and a portion of the steam enters a feed water/de-aerator vessel 436 in order to de-aerate the feed water. The steam may exit the turbines through a plurality of exits. Each portion of steam exiting each of the plurality of exits may have a different temperature and pressure. For example, the small portion of the steam that enters the feed water/de-aerator vessel 436 has a higher pressure and temperature than the portion of the steam entering the condenser 435. A cooling water loop cycles cooling water from a cooling water tower 437 via cooling water pumps 438 to the condenser 435 in order to condense the steam that exits the low-pressure turbine 433. The condensate from the condenser 435 is pumped via low-pressure feed water pumps 439 to optional low-pressure feed water heater exchangers 440, where it may be preheated by steam extractions from the low-pressure turbine 433. The preheated water enters the feed water/de-aerator vessel 436 at a temperature of about 100 degrees Celsius and is next pumped from high-pressure feed water pumps 441 via optional high-pressure feed water heat exchangers 442 back to the preheater 425. The high-pressure feed water heat exchangers 442 heat the water with steam extractions from the high-pressure turbine 432.

Example 6

Production of Superheated Steam (Three Vessels Design)

Figure 5:
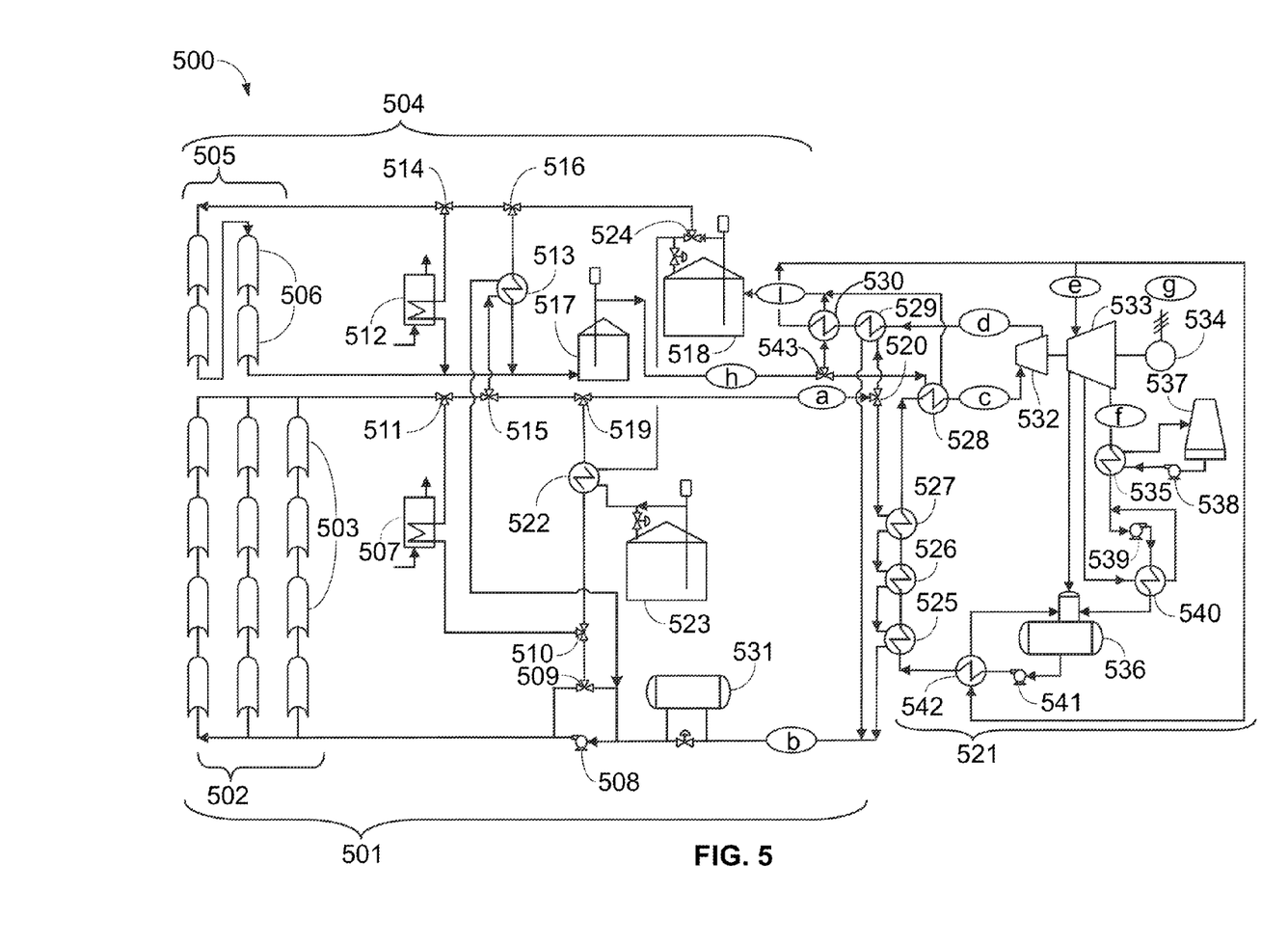
FIG. 5 is a schematic diagram of an apparatus for producing superheated steam using two parabolic trough solar collector systems, an organic heat transfer fluid, a molten salt, and three thermal energy storage vessels, in accordance with an illustrative embodiment.

Superheated steam is produced using two solar energy collection systems, such as parabolic trough solar collector systems or linear Fresnel solar collector systems, one heat transfer fluid, such as DOWTHERM™ A, and a molten salt. FIG. 5 illustrates an apparatus 500 for producing superheated steam and for using that superheated steam to produce electricity. The apparatus 500 comprises a first cycle 501, which includes a solar energy collection system 502 comprising a first plurality of parabolic trough solar collectors 503, and a second cycle 504, which includes a solar energy collection system 505 comprising a second plurality of parabolic trough solar collectors 506. The same results are obtained using linear Fresnel solar collector systems. A heat transfer fluid such as DOWTHERM™ A is introduced into the solar energy collection system 502. The solar energy collection system 502 heats the heat transfer fluid to a temperature of about 393 degrees Celsius (at point a). An optional fuel fired heat transfer fluid heater 507 may also assist in heating the heat transfer fluid, for example, at start-up or during cold periods to prevent the system from freezing. Before and/or after heat transfer fluid circulation pumps 508, the heat transfer fluid may enter a first valve 509 and a second valve 510. The heat transfer fluid then may flow through the fuel fired heat transfer fluid heater 507, where the heat transfer fluid may be heated. The heat transfer fluid may then enter a third valve 511.

In the second cycle 504, a molten salt is introduced into the solar energy collection system 505. The solar energy collection system 505 heats the molten salt to a temperature of about 565 degrees Celsius (at point h). An optional fuel fired molten salt heater 512 may also assist in heating the heat transfer fluid, for example, at start-up or during cold periods to prevent the system from freezing. In addition, an optional first heat exchanger system 513 may heat the molten salt using the heat transfer fluid from the first cycle 501 or the molten salt from the second cycle 504 may heat the heat transfer fluid from the first cycle 501 via the first heat exchanger system 513. The molten salt may enter a fourth valve 514 and then may flow through the fuel fired molten salt heater 512, where the molten salt may be heated. If there is sufficient heat stored in the first cycle 501, the heat transfer fluid from the first cycle 501 may enter a fifth valve 515 and then may flow through the heat transfer fluid heat exchanger 513 before returning to the first cycle 501. The molten salt may enter a sixth valve 516 and then flow through the heat transfer fluid heat exchanger 513, where it is heated by the heat transfer fluid. After being heated by the second solar energy collection system 505, the fuel fired molten salt heater 512, and/or the heat transfer fluid heat exchanger 513, the molten salt enters a hot molten salt storage vessel 517.

The first solar energy collection system 502 and the second solar energy collection system 505 are designed to provide excessive energy during the daylight hours, which is stored in the hot molten salt storage vessel 517 and a medium temperature molten salt storage vessel 518. During high-radiation sunshine hours, a partial flow from the first solar energy collection system 502 passes through the third valve 511, the fifth valve 515, a seventh valve 519, and an eighth valve 520 to a Rankine cycle 521 and the other portion enters a second heat exchanger system 522 via the seventh valve 519, where the molten salt from a cold molten salt storage vessel 523 is heated and pumped to the medium temperature molten salt storage vessel 518. The heat transfer fluid that passes through the second heat exchanger system 522, also passes through second valve 510 and first valve 509, and is then pumped back to the first solar energy collection system 502 by the heat transfer fluid circulation pumps 508 for further heating. In the second cycle 504, the molten salt from medium temperature molten salt storage vessel 518 is pumped via the sixth valve 516 and the fourth valve 514 back to the second solar energy collection system 505 to be heated. The hot molten salt from the second solar energy collection system 505 is then stored in the hot molten salt storage vessel 517. The hot molten salt storage vessel 517, the medium temperature molten salt storage vessel 518, and the cold molten salt storage vessel 523 include transfer pumps.

When sunshine is not sufficient to heat the heat transfer fluid and the molten salt, the apparatus 500 switches to a freeze protection mode and the Rankin cycle 521 is heated by the stored energy from the hot molten salt storage vessel 517 and the medium temperature molten salt storage vessel 518. The heat transfer fluid may be pumped by the heat transfer fluid circulation pumps 508 through the first valve 509 and the second valve 510. Then, the heat transfer fluid may flow either through the fuel fired heat transfer fluid heater 507 (optional) or through the second heat exchanger system 522, where the heat transfer fluid may be heated before entering the third valve 511 or the seventh valve 519 and then entering the Rankine cycle 521 via the eighth valve 520. Molten salt from the medium temperature molten salt storage vessel 518 is pumped via a ninth valve 524 and the second heat exchanger system 522 to the cold molten salt storage vessel 523, while the heat transfer fluid that passes through the second heat exchanger system 522 is heated. In the second cycle 504, the molten salt may be pumped from the hot molten salt storage vessel 517 to the Rankine cycle 521 and then to the medium temperature molten salt storage vessel 518.

After being heated, the heat transfer fluid and the molten salt are used to heat a working fluid in the Rankine cycle 521. The Rankine cycle includes various shell and tube heat exchangers: a preheater 525, an evaporator 526, a first superheater 527, a second superheater 528, a pre-reheater 529, and a reheater 530. In other embodiments, the pre-reheater 529 may be optional. At the eighth valve 520, a portion of the heat transfer fluid flows through the pre-reheater 529 and a portion of the heat transfer fluid flows through the first superheater 527, the evaporator 526, and the preheater 525. The molten salt enters a tenth valve 543 from where a partial flow goes through the second superheater 528 and the other portion to the reheater 530. In alternative embodiments, the molten salt flow may flow through the second superheater 528 first and then through the reheater 530. After passing through the heat exchangers, the heat transfer fluid is at a temperature of about 288 degrees Celsius (at point b). The heat transfer fluid is then pumped by the heat transfer fluid circulation pumps 508 to the first solar energy collection system 502 to be heated again. During startup and venting operations, the heat transfer fluid passes through a heat transfer fluid expansion vessel 531. During normal operation, the heat transfer fluid bypasses the heat transfer fluid expansion vessel 531.

After the molten salt passes through the heat exchangers, it enters the medium temperature molten salt storage vessel 518 before entering the ninth valve 524 and either returning to the second solar energy collection system 505 to be heated again or entering the second heat exchanger system 522 to heat the heat transfer fluid.

The Rankine cycle 521 may operate as explained in Example 3. In the Rankine cycle 521, a working fluid such as water is superheated and used to generate electricity. The water flows through the preheater 525, where it is heated to about the boiling point of water. It then flows through the evaporator 526, where it is brought to a boil. It next flows through the first superheater 527 and the second superheater 528, where it is superheated to about 530 degrees Celsius at a pressure of about $1\times10^7$ Pascal (100 bar) (at point c). The superheated steam is expanded across a high-pressure turbine 532, where it cools to about 307 degrees Celsius and the pressure to about $2\times10^6$ Pascal (20 bar) (at point d). A portion of the steam then flows through the pre-reheater 529 and the reheater 530, where it is heated again to about 530 degrees Celsius at a pressure of about $2\times10^6$ Pascal (20 bar) (at point e). Next, the low-pressure steam expands over a low-pressure turbine 533.

The high-pressure turbine 532 and the low-pressure turbine 533 power a generator 534 at power of about 27.5 megawatts and a Rankine cycle efficiency of about 39.6 percent (at point g). Compared to Example 1, this Example provides a higher Rankine efficiency due to the higher temperature of the superheated steam.

After expanding over the low-pressure turbine 533, the steam is at a temperature of about 46 degrees Celsius and a pressure of about $1\times10^4$ Pascal (0.1 bar) (at point f). A portion of the steam then enters a condenser 535 and a portion of the steam enters a feedwater/de-aerator vessel 536 in order to de-aerate the feed water. The steam may exit the turbines through a plurality of exits. Each portion of steam exiting each of the plurality of exits may have a different temperature and pressure. For example, the small portion of the steam that enters the feed water/de-aerator vessel 536 has a higher pressure and temperature than the portion of the steam entering the condenser 535. A cooling water loop cycles cooling water from a cooling water tower 537 via cooling water pumps 538 to the condenser 535 in order to condense the steam that exits the low-pressure turbine 533. In alternative embodiments, the cooling may be performed through air-cooling or dry cooling.

The condensate from the condenser 535 then is pumped via low-pressure feed water pumps 539 to optional low-pressure feed water heat exchangers 540, where it may be preheated by steam extractions from the low-pressure turbine 533. The preheated water enters the feed water/de-aerator vessel 536 at about 100 degrees Celsius and is next pumped from high-pressure feed water pumps 541 via optional high-pressure feed water heat exchangers 542 back to the preheater 525. The high-pressure feed water heat exchangers 542 heat the water with steam extractions from the high-pressure turbine 532.

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

What is claimed is:

1. An apparatus comprising:
  a first linear solar collector system for heating a first heat transfer medium;
  a second linear solar collector system for heating a second heat transfer medium, wherein the first and the second linear collector system are of the same collector type;
  a first heat exchanger system configured to use the heat from the first heat transfer medium to preheat and evaporate water and superheat steam;
  a second heat exchanger system configured to use the heat from the second heat transfer medium to increase the temperature of the superheated steam generated by the first heat exchanger system; and
  one or more storage vessels for the second heat transfer medium,
  wherein the second heat transfer medium is used to heat the first transfer medium.

2. An apparatus according to claim 1, wherein the first heat transfer medium is an organic heat transfer fluid or a silicone-based heat transfer fluid.

3. An apparatus according to claim 1, wherein the second heat transfer medium is a molten salt.

4. An apparatus according to claim 1, wherein the first heat transfer medium is heated to a temperature of between 350 degrees Celsius and 425 degrees Celsius.

5. An apparatus according to claim 1, wherein the second heat transfer medium is heated to a temperature of between 450 degrees Celsius and 600 degrees Celsius.

6. An apparatus according to claim 1, wherein the first heat transfer medium is used to heat the second heat transfer medium.

7. An apparatus according to claim 1, wherein the first linear solar collector system and the second linear solar collector system are selected from the group consisting of parabolic trough solar collector systems and linear Fresnel solar collector systems.

8. A process comprising:
  heating a first heat transfer medium in a first linear solar collector system;
  heating a second heat transfer medium in a second linear solar collector system, wherein the first linear solar collector system and the second linear collector system are of the same collector type;
  supplying a working fluid to a heat exchange system, wherein the heat exchange system comprises at least a first heat exchanger system for preheating, evaporating, and superheating and at least a second heat exchanger system for further superheating; supplying the first heat transfer medium to the first heat exchanger system;
  supplying the second heat transfer medium to the second heat exchanger system for superheating the working fluid;
  storing the second heat transfer medium in one or more storage vessels; and
  heating the first heat transfer medium with the stored second heat transfer medium.

9. A process according to claim 8, wherein the first heat transfer medium is an organic heat transfer fluid or a silicone-based heat transfer fluid.

10. A process according to claim 8, wherein the second heat transfer medium is a molten salt.

11. A process according to claim 8, further comprising returning the stored second heat transfer medium to the one or more storage vessels after it has heated the first heat transfer medium.

12. A process according to claim 8, further comprising heating the second heat transfer medium with the first heat transfer medium.

13. A process according to claim 8, wherein the working fluid is water and the heat exchange system produces superheated steam.

14. An process according to claim 8, wherein the first linear solar collector system and the second linear solar collector system are selected from the group consisting of parabolic trough solar collector systems and linear Fresnel solar collector systems.

15. An apparatus, said apparatus comprising:
a first linear solar collector system for heating a first heat transfer medium;
a second linear solar collector system for heating a second heat transfer medium, wherein the first linear collector system and the second linear collector system are of the same collector type;
a preheater configured to preheat water to produce preheated water, using heat from the first heat transfer medium;
an evaporator configured to evaporate the preheated water to produce steam at a first temperature, using heat from the first heat transfer medium;
a first superheater configured to superheat the steam to a second temperature to produce superheated steam, using heat from the first heat transfer medium, wherein the second temperature is greater than the first temperature;
a second superheater configured to further superheat the superheated steam to a third temperature, using heat from the second heat transfer medium, wherein the third temperature is greater than the second temperature; and
one or more storage vessels for storing the second heat transfer medium,
wherein the second heat transfer medium is used to heat the first transfer medium.

16. An apparatus according to claim 15, wherein the third temperature is between 370 degrees Celsius and 570 degrees Celsius.

17. An apparatus according to claim 15, further comprising an electric generator powered, at least in part, by the superheated steam.

18. An apparatus according to claim 15, wherein the first heat transfer medium is an organic heat transfer fluid or a silicone-based heat transfer fluid and the second heat transfer medium is a molten salt.

* * * * *